US012737775B2

(12) United States Patent
Wilkowski et al.

(10) Patent No.: US 12,737,775 B2
(45) Date of Patent: Sep. 15, 2026

(54) SYSTEM AND METHODS FOR PREDICTIVE MODELING OF ENERGY USING MACHINE-LEARNING MODELS

(71) Applicant: State Farm Mutual Automobile Insurance Company, Bloomington, IL (US)

(72) Inventors: Phillip M. Wilkowski, Gilbert, AZ (US); Sharon Gibson, Apache Junction, AZ (US); Steve Kelley, Buckeye, AZ (US); John Mullins, Santa Monica, CA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 19/044,190

(22) Filed: Feb. 3, 2025

(65) Prior Publication Data

US 2026/0195771 A1 Jul. 9, 2026

Related U.S. Application Data

(60) Provisional application No. 63/742,709, filed on Jan. 7, 2025.

(51) Int. Cl.

*G06Q 30/018* (2023.01)
*G06Q 30/0234* (2023.01)

(Continued)

(52) U.S. Cl.

CPC ....... *G06Q 30/018* (2013.01); *G06Q 30/0234* (2013.01); *G06Q 50/06* (2013.01); *G06Q 50/26* (2013.01)

(58) Field of Classification Search

None

See application file for complete search history.

(56) References Cited

U.S. PATENT DOCUMENTS

| | | | |
|---|---|---|---|
| 8,433,344 | B1 | 4/2013 | Virga |
| 8,712,805 | B1 | 4/2014 | Ferries et al. |

(Continued)

FOREIGN PATENT DOCUMENTS

| | | | |
|---|---|---|---|
| AU | 2015100551 | A4 | 5/2015 |
| WO | 2018052595 | A1 | 3/2018 |

OTHER PUBLICATIONS

"Energy Efficient Lighting Rebate Finder | Signify." Signify, www.signify.com/en-us/support/tools/energy-efficient-lighting-rebate-finder.

(Continued)

*Primary Examiner* — Allan J Woodworth, II

(74) *Attorney, Agent, or Firm* — Bookoff McAndrews, PLLC

(57) ABSTRACT

Systems and methods for energy optimization and identifying an energy efficiency program for a property are disclosed. The method may include, such as by one or more processors, transceivers, and/or sensors: (1) receiving input data associated with the property; (2) analyzing the input data to determine a property profile; (3) inputting the property profile and data from data sources for energy efficiency programs into a machine-learning model; (4) processing, utilizing the machine-learning model, the input data to (i) classify energy usage patterns, and/or (ii) predict energy savings inefficiencies; (5) matching, utilizing the machine-learning model, an energy efficiency program to the property based upon the input data and the predicted energy savings inefficiencies; (6) generating an energy assessment and a cost analysis based upon the predicted energy savings inefficiencies and the energy efficiency program; and/or (7) generating an interactive visualization of the energy assessment and the energy efficiency program.

20 Claims, 5 Drawing Sheets

(51) Int. Cl.
*G06Q 50/06* (2024.01)
*G06Q 50/26* (2024.01)

(56) References Cited

U.S. PATENT DOCUMENTS

| | | | | |
|---|---|---|---|---|
| 10,055,793 | B1 | 8/2018 | Call et al. | |
| 10,062,118 | B1 | 8/2018 | Bernstein et al. | |
| 10,229,394 | B1 | 3/2019 | Davis et al. | |
| 10,623,509 | B2 | 4/2020 | Delinselle et al. | |
| 10,672,081 | B1 | 6/2020 | Lyons et al. | |
| 10,699,346 | B1 | 6/2020 | Corder et al. | |
| 10,861,115 | B1 | 12/2020 | Stricker et al. | |
| 11,003,334 | B1 | 5/2021 | Conway et al. | |
| 11,037,255 | B1 | 6/2021 | Ganev et al. | |
| 11,055,797 | B1 | 7/2021 | Carone | |
| 11,087,347 | B1 | 8/2021 | De Guia et al. | |
| 11,087,420 | B1 | 8/2021 | Trundle | |
| 11,210,741 | B1 | 12/2021 | Allen et al. | |
| 11,501,100 | B1 | 11/2022 | Geng et al. | |
| 11,656,097 | B2 | 5/2023 | Vega et al. | |
| 11,748,817 | B2 | 9/2023 | Szott | |
| 2008/0255862 | A1 | 10/2008 | Bailey et al. | |
| 2011/0270773 | A1 | 11/2011 | Siekman et al. | |
| 2011/0295624 | A1 | 12/2011 | Chapin et al. | |
| 2012/0072239 | A1 | 3/2012 | Gibbard et al. | |
| 2014/0361908 | A1* | 12/2014 | Laird | G01F 15/061 73/861.77 |
| 2015/0061859 | A1 | 3/2015 | Matsuoka et al. | |
| 2015/0094968 | A1* | 4/2015 | Jia | G05B 15/02 702/60 |
| 2016/0048934 | A1 | 2/2016 | Gross | |
| 2016/0055594 | A1 | 2/2016 | Emison | |
| 2016/0275633 | A1 | 9/2016 | Gitt et al. | |
| 2016/0321587 | A1 | 11/2016 | Gitt et al. | |
| 2018/0033087 | A1 | 2/2018 | Delinselle et al. | |
| 2019/0251520 | A1 | 8/2019 | Bentley, III et al. | |
| 2019/0370913 | A1* | 12/2019 | Garud | G06Q 30/0283 |
| 2019/0372345 | A1* | 12/2019 | Bain | H02J 3/008 |
| 2020/0380038 | A1* | 12/2020 | Rosset | G06F 16/951 |
| 2021/0011448 | A1 | 1/2021 | Coleman et al. | |
| 2021/0018335 | A1 | 1/2021 | Hood | |
| 2021/0019847 | A1 | 1/2021 | Sneed | |
| 2021/0125053 | A1* | 4/2021 | Faibish | G06N 3/082 |
| 2021/0125129 | A1* | 4/2021 | Vega | G06Q 10/06315 |
| 2021/0125197 | A1* | 4/2021 | Lopuch | G06Q 30/0201 |
| 2021/0150651 | A1 | 5/2021 | Shoup | |
| 2021/0182986 | A1 | 6/2021 | Butler et al. | |
| 2021/0279791 | A1 | 9/2021 | Jacoby | |
| 2021/0350471 | A1 | 11/2021 | Hakimi-Boushehri et al. | |
| 2022/0036108 | A1* | 2/2022 | Zhang | G06V 20/62 |
| 2022/0343443 | A1 | 10/2022 | Graham et al. | |
| 2022/0391794 | A1 | 12/2022 | Singh et al. | |
| 2023/0035517 | A1 | 2/2023 | Bentley, III et al. | |
| 2024/0111258 | A1* | 4/2024 | Berrien | F24F 11/62 |
| 2025/0329009 | A1* | 10/2025 | Baek | G06T 7/0004 |

OTHER PUBLICATIONS

"How Much Can You Save by Going Electric?" Rewiring America, homes. rewiringamerica. org/savings-calculator-email?gad_source=1&gclid=EAlalQobChMImd7CjoPliAMV-Er_AR2t1SzqEAMYAiAAEgLF4fD_BwE.

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Product Rebate Finder. www.energystar.gov/rebate-finder.

Rebate Finder | Smart Home Devices and Thermostats | Ecobee. www.ecobee.com/en-us/rebates.

Spoor et al., "How can data generated by smart home devices help identify consumer needs?," p. 7, Jul. 2016. Retrieved from: https://essay.utwente.nl/69990/1/Spoor_BA_BMS.pdf.

* cited by examiner

2/5

SYSTEM AND METHODS FOR PREDICTIVE MODELING OF ENERGY USING MACHINE-LEARNING MODELS

CROSS-REFERENCE TO RELATED APPLICATION

This patent application claims the benefit of priority to U.S. Provisional Application No. 63/742,709, filed on Jan. 7, 2025, the entirety of which is incorporated herein by reference.

TECHNICAL FIELD

This present disclosure relates generally to the field of property energy optimization using data-driven computational systems. In particular, the present disclosure relates to analyzing energy usage patterns, predicting inefficiencies using machine-learning model(s), and dynamically matching properties to applicable energy efficiency programs.

BACKGROUND

Conventional systems for identifying energy inefficiencies in properties (e.g., residential homes, commercial buildings, industrial facilities, etc.) may face significant technical challenges due to the system's reliance upon static assessment and generalized benchmarks. The conventional methods may often fail to account for the unique characteristics of each property, overlooking granular details such as specific energy usage patterns, peak loads, or inefficiencies in subsystems (e.g., HVAC, insulation, appliances, machinery, etc.). The lack of real-time or predictive capabilities may make it difficult for conventional methods to anticipate inefficiencies arising from changing usage behaviors, seasonal variations, or aging infrastructure. Additionally, traditional systems may struggle to integrate diverse data sources, such as historical energy consumption, appliance performance, and environmental factors. Without the adaptability offered by machine-learning techniques, conventional approaches may remain static and ineffective in addressing the evolving complexities of energy landscapes.

Conventional methods may find it technically challenging to recommend energy efficiency programs (e.g., rebate programs) due to a lack of advanced integration between property-specific energy data and energy efficiency program databases (e.g., rebate databases). The traditional system(s) may lack the technical ability to correlate identified energy inefficiencies with the eligibility criteria of energy efficiency programs in real-time. Furthermore, the absence of predictive analytics or intelligent matching mechanisms may limit the ability of the traditional system to provide precise and actionable recommendations. Conventional techniques may include additional inefficiencies, encumbrances, ineffectiveness, and other drawbacks, as well.

SUMMARY

The present embodiments may relate, inter alia, to energy optimization and energy efficiency program recommendation systems, such as those discussed above and elsewhere herein. Specifically, the present computer systems and computer-implemented methods may solve technical challenges by leveraging advanced machine-learning models and data aggregation techniques to dynamically analyze property-specific energy usage patterns, predict inefficiencies, and recommend energy efficiency programs. By integrating diverse data sources (e.g., historical energy data, real-time consumption metrics, environmental factors, and/or energy efficiency program databases) the system may generate actionable insights and match identified inefficiencies with optimal energy efficiency programs. This approach may overcome the limitations of static methodologies by employing predictive algorithms and dynamic modeling to adapt to evolving usage patterns, thereby seamlessly aligning energy-saving opportunities with financial incentives, and delivering personalized recommendations to improve property energy efficiency.

In one aspect, a computer-implemented method for energy optimization and identifying an energy efficiency program for a property may be provided. The computer-implemented method may be implemented via one or more local or remote processors, servers, transceivers, memory units, mobile devices, voice bots or chatbots, ChatGPT bots, InstructGPT bots, Codex bots, Google Bard bots, and/or other electronic or electrical components, which may be in wired or wireless communication with one another. In one instance, the computer-implemented method may be performed by one or more local or remote processors of a computing system in communication with one or more local or remote data sources.

The computer-implemented method may include, via one or more processors, transceivers, sensors, servers, and/or other components: (1) receiving, by the one or more processors, input data associated with the property from one or more sensors, wherein the input data may include one or more attributes; (2) analyzing, by the one or more processors, the input data to determine a property profile; (3) inputting, by the one or more processors, the property profile and data from the one or more data sources for one or more energy efficiency programs into a machine-learning model; (4) in response to the inputting, processing, by the one or more processors utilizing the machine-learning model, the input data to (i) classify one or more energy usage patterns of the property, and/or (ii) predict one or more energy savings inefficiencies for the property; (5) matching, by the one or more processors utilizing the machine-learning model, at least one energy efficiency program from the one or more energy efficiency programs to the property based upon the input data and the predicted one or more energy savings inefficiencies; (6) generating, by the one or more processors, an energy assessment of the property and a cost analysis based upon the predicted one or more energy savings inefficiencies and the at least one energy efficiency program; and/or (7) generating, by the one or more processors, an interactive visualization of the energy assessment and the at least one energy efficiency program in a graphical user interface of a device, wherein the visualization dynamically updates based upon real-time data received from the one or more sensors corresponding to energy usage. The method may include additional, less, or alternate functionality, including that discussed elsewhere herein.

In another aspect, a computer system for energy optimization and identifying an energy efficiency program for a property may be provided. The computer system may be implemented via one or more local or remote processors, servers, transceivers, memory units, mobile devices, voice bots or chatbots, ChatGPT bots, InstructGPT bots, Codex bots, Google Bard bots, and/or other electronic or electrical components, which may be in wired or wireless communication with one another. In one instance, the computer system may be performed by one or more local or remote processors of a computing system in communication with one or more local or remote data sources, and at least one non-transitory computer readable medium storing instructions which, when executed by the one or more processors, cause the one or more processors to perform certain operations.

The system may include, via one or more processors, non-transitory computer readable medium, transceivers, sensors, servers, and/or other components to perform operations that may include: (1) receiving input data associated with the property from one or more sensors, wherein the input data may include one or more attributes; (2) analyzing the input data to determine a property profile; (3) inputting the property profile and data from the one or more data sources for one or more energy efficiency programs into a machine-learning model; (4) in response to the inputting, processing, utilizing the machine-learning model, the input data to (i) classify one or more energy usage patterns of the property, and/or (ii) predict one or more energy savings inefficiencies for the property; (5) matching, utilizing the machine-learning model, at least one energy efficiency program from the one or more energy efficiency programs to the property based upon the input data and the predicted one or more energy savings inefficiencies; (6) generating an energy assessment of the property and a cost analysis based upon the predicted one or more energy savings inefficiencies and the at least one energy efficiency program; and/or (7) generating an interactive visualization of the energy assessment and the at least one energy efficiency program in a graphical user interface of a device, wherein the visualization dynamically updates based upon real-time data received from the one or more sensors corresponding to energy usage. The system may include additional, less, or alternate functionality, including that discussed elsewhere herein.

In yet another aspect, a non-transitory computer readable medium for energy optimization and identifying an energy efficiency program for a property may be provided. The non-transitory computer readable medium may be implemented via one or more local or remote processors, servers, transceivers, memory units, mobile devices, voice bots or chatbots, ChatGPT bots, InstructGPT bots, Codex bots, Google Bard bots, and/or other electronic or electrical components, which may be in wired or wireless communication with one another. In one instance, the non-transitory computer readable medium may be performed by one or more local or remote processors of a computing system in communication with one or more local or remote data sources, and at least one non-transitory computer readable medium storing instructions which, when executed by the one or more processors, cause the one or more processors to perform certain operations.

The non-transitory computer readable medium may include, via one or more processors, transceivers, sensors, and/or other components: (1) receiving input data associated with the property from one or more sensors, wherein the input data may include one or more attributes; (2) analyzing the input data to determine a property profile; (3) inputting the property profile and data from the one or more data sources for one or more energy efficiency programs into a machine-learning model; (4) in response to the inputting, processing, utilizing the machine-learning model, the input data to (i) classify one or more energy usage patterns of the property, and/or (ii) predict one or more energy savings inefficiencies for the property; (5) matching, utilizing the machine-learning model, at least one energy efficiency program from the one or more energy efficiency programs to the property based upon the input data and the predicted one or more energy savings inefficiencies; (6) generating an energy assessment of the property and a cost analysis based upon the predicted one or more energy savings inefficiencies and the at least one energy efficiency program; and/or (7) generating an interactive visualization of the energy assessment and the at least one energy efficiency program in a graphical user interface of a device, wherein the visualization dynamically updates based upon real-time data received from the one or more sensors corresponding to energy usage. The operations may include additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Advantages will become more apparent to those skilled in the art from the following description of the preferred embodiments that have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

The present embodiments may relate, inter alia, to computer systems and computer-implemented methods that may detect, in real-time or near real-time, energy inefficiencies in a property, and may dynamically match the property with optimal energy efficiency programs using machine-learning models.

Conventional systems for identifying inefficiencies in energy usage often rely upon static rule-based frameworks or generalized energy audits that may fail to account for the unique characteristics of each property. These systems typically lack the technical ability to integrate multidimensional data, such as historical energy consumption patterns, localized environmental factors, and real-time usage variability. Additionally, the system's analysis may be constrained by generalized benchmarks, making it difficult to identify nuanced inefficiencies unique to individual properties. This may result in inaccurate assessments that either overestimate or underestimate inefficiencies, leading to suboptimal recommendations for energy-saving upgrades.

Traditional methods may rely heavily upon manual procedures or rigid matching processes, which may struggle to efficiently analyze the diverse and evolving nature of property energy usage and energy efficiency programs. For example, the traditional approaches may struggle to match the property to an appropriate energy efficiency program. This may be due to the technical challenges in managing the diversity of such energy efficiency programs across different regions and suppliers, each with distinct eligibility criteria.

In addition, the conventional approaches may be technically challenged in incorporating advanced analytics or predictive modeling, making it difficult to pinpoint subtle inefficiencies or forecast long-term energy performance trends. This lack of adaptability may lead to generalized recommendations that may overlook specific inefficiencies unique to the property. Furthermore, conventional systems may lack the technical capability to integrate machine-learning models for dynamically adjusting the insights as new data becomes available, resulting in leaving the systems unable to adapt to changes in energy usage behavior.

Exemplary Computer System

Figure 1:
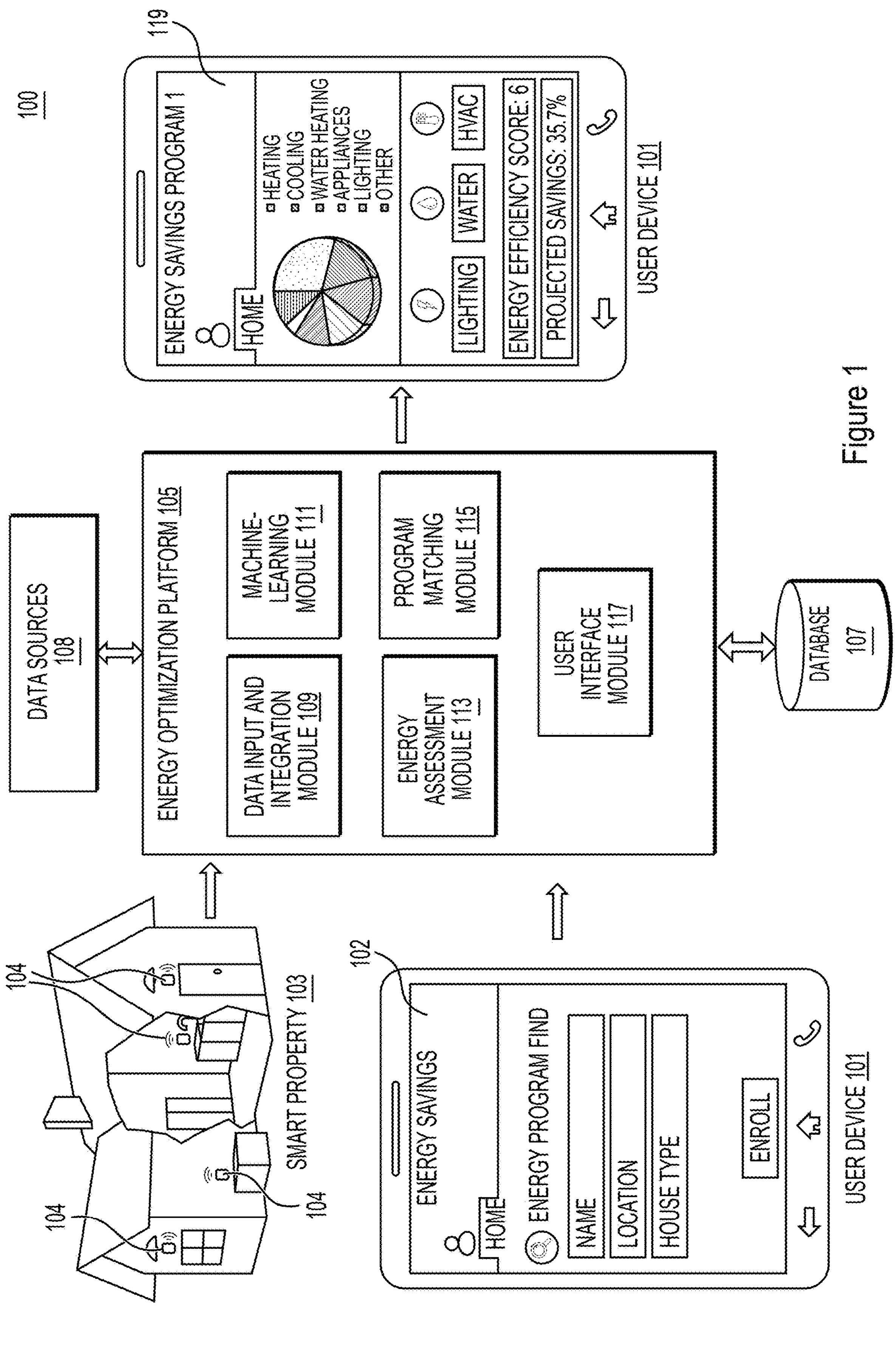
FIG. 1 is a diagram showing an exemplary computer system that utilizes machine-learning for classifying energy usage patterns, identifying inefficiencies, dynamically matching energy efficiency programs, and predicting energy saving, according to certain aspects of the disclosure.

To address technical challenges, such as the above, the computing system 100 of FIG. 1 may leverage advanced machine-learning algorithms to accurately identify inefficiencies and recommend optimized energy efficiency programs. Unlike traditional systems, which may rely upon static assessment and generalized benchmarks, the computing system 100 may utilize a data-driven approach that may continuously ingest, analyze, and adapt to real-time energy consumption patterns, environmental changes, and user behaviors. By integrating multiple data sources (e.g., historical energy usage data, appliance-specific performance metrics, environmental factors, and external conditions) the computing system 100 may create a comprehensive and dynamic profile of a property's energy landscape. Such a profile may enable the computing system 100 to precisely identify inefficiencies at a granular level, such as wasted energy from outdated appliances or suboptimal insulation, which the conventional systems may be unable to detect due to a lack of advanced analytics.

In addition, the computing system 100 may incorporate predictive analytics to dynamically forecast future energy inefficiencies based upon a property's historical energy consumption trends, operational patterns, and other context-specific variables. The traditional systems may be limited to static and reactive assessments, whereas the computing system 100 may identify potential inefficiencies before such inefficiencies occur, allowing for timely interventions. The integration of machine-learning models may facilitate the computing system 100 to learn from new data, improving its efficiency predictions over time and providing an evolving solution that may continuously adapt to changing energy dynamics.

Furthermore, the computing system 100 may introduce a sophisticated matching algorithm for matching energy efficiency programs (e.g., rebate programs) to the specific needs of the property. This intelligent matching algorithm may consider the identified inefficiencies and the eligibility criteria for a wide array of energy efficiency programs. By dynamically correlating property attributes with program requirements, the computing system 100 may recommend energy efficiency programs based upon factors, such as the property's energy usage profile, the impact of the recommended upgrades, and/or the financial benefit offered.

Additionally, the computing system 100 may integrate a real-time feedback loop (e.g., user inputs upon previous upgrade experience) to continuously refine the energy assessment and energy efficiency program recommendations. The feedback may be processed through the machine-learning model that may recalibrate the predictions, ensuring that the recommendations remain relevant and personalized to a user's specific circumstances.

FIG. 1 depicts a diagram showing an exemplary computer system that integrates energy usage data associated with a property, machine-learning algorithms, and energy efficiency program databases to perform energy assessments, predict inefficiencies, and recommend a tailored energy efficiency program. FIG. 1 may include the computing system 100 that may include a user device 101, a smart property 103, an energy optimization platform 105, a database 107, and data sources 108. It should be understood that other implementations of computing system 100 may omit one or more of the foregoing components and/or may include additional components, as the case may be.

In one instance, the user device 101 may include but is not restricted to, any type of mobile terminal, wireless terminal, fixed terminal, or portable terminal. Examples of the user device 101 may include hand-held computers, desktop computers, laptop computers, wireless communication devices, cell phones, smartphones, mobile communications devices, a Personal Communication System (PCS) device, tablets, server computers, gateway computers, or any combination thereof, including the accessories and peripherals of these devices, or any combination thereof. In one example, users may utilize user interface 102 of the user device 101 to register their property (e.g., smart property 103) with a service (e.g., energy efficiency program finding service). During the registration, the user may input property details, including the address, property attributes (e.g., square footage, property type, existing appliances), and energy usage. The users may also upload pictures of their properties to document specific areas of the property for energy assessment. The user device 101 may utilize location-based applications to verify the location of the property and may pull relevant regional data, such as local climate patterns and available energy efficiency programs. Once the registration is completed, and the property data is submitted, the energy optimization platform 105 may process the information to generate an initial energy profile for the property.

In one instance, energy efficiency programs, such as rebate programs, are designed to encourage property owners to adopt measures that may reduce energy consumption and improve overall energy performance. These programs may include financial incentives, such as rebates, grants, or tax credits to offset the cost of energy-efficient upgrades. Examples of qualifying upgrades may include installing energy-efficient appliances, upgrading insulation, or adopting renewable energy solutions. The energy efficiency programs may often include specific eligibility criteria, such as a geographic location, a property type, or a baseline energy usage, and may be aimed at fostering sustainable energy practice while reducing utility costs for participants.

The smart property 103 may include any type of residential, commercial, or industrial property. In one example, the smart property 103 may include a single-family home, an apartment complex, a townhouse, a multi-story commercial building, or an industrial facility. The smart property 103 may include sensors 104 that may continuously monitor energy usage of the smart property 103. The sensors 104 may include but are not limited to:

(i) Smart meters to measure electricity consumption across the property;
(ii) Thermostats to monitor temperature settings and heating or cooling systems;
(iii) Light sensors to track use of lighting systems within the property;
(iv) Appliance energy trackers to measure the energy consumption of specific appliances;
(v) Water flow sensors to monitor water consumption; and/or
(vi) Water pressure sensors to detect leaks or inefficiencies in water distribution systems.

The sensors 104 may be strategically installed throughout the smart property 103 to capture real-time data upon electricity consumption, heating and cooling patterns, water consumption, and overall energy efficiency of the smart property 103. The sensors 104 may work together to transmit comprehensive data to the energy optimization platform 105 for analysis.

In one instance, the energy optimization platform 105 may include a platform with multiple interconnected components. The energy optimization platform 105 may include one or more servers, intelligent networking devices, computing devices, components, and corresponding software for energy optimization and energy efficiency program matching to facilitate users in enhancing their property's energy efficiency and reduce costs. Leveraging data from diverse sources, including property details, climate conditions, energy usage patterns, historical data, and energy efficiency programs, the energy optimization platform 105 may utilize advanced analytics and machine-learning to classify energy usage patterns, detect inefficiencies, identify energy efficiency programs, and predict energy savings.

Further, the energy optimization platform 105 may dynamically match properties with relevant energy efficiency programs, scoring and ranking them to present the best options. The energy optimization platform 105 may provide users with a clear, interactive visualization of their energy consumption trends, ranked recommendations, predicted improvements, and potential savings from selected programs. By integrating sophisticated data processing, machine-learning, and predictive modeling, the energy optimization platform 105 may provide a solution for reducing energy consumption, improving sustainability, and maximizing rebate benefits.

In one instance, the energy optimization platform 105 may include data input and integration module 109, a machine-learning module 111, an energy assessment module 113, a program matching module 115, and a user interface module 117, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one instance, the data input and integration module 109 may receive, in real-time or near real-time, data from user device 101 and/or various sensors installed within the smart property 103 (e.g., sensors 104). Such data may provide detailed insights into current energy and water consumption patterns of the smart property 103. Additionally, the data input and integration module 109 may query external data sources (e.g., data sources 108) for historical data associated with the smart property 103. The historical data may include past utility bills, energy usage trends, weather patterns, and participation in energy efficiency programs. The data input and integration module 109 may integrate the collected data into a unified framework and may perform data normalization to ensure compatibility across various formats and sources. This robust data foundation may facilitate advanced analytics and machine-learning algorithms to assess the property's performance, predict inefficiencies, and identify opportunities for energy and cost savings.

In one instance, the machine-learning module 111 may be configured for supervised machine-learning and utilizing training data (e.g., training data 312 illustrated in the training data flow 300). The trained model may be configured for classifying energy usage patterns, predicting inefficiencies, and/or matching energy efficiency programs. In one example, the machine-learning module 111 may perform model training using training data (e.g., data from other modules, which contain input and correct output, to allow the model to learn over time). The training may performed based upon the deviation of a processed result from a documented result when the inputs are fed into the machine-learning model (e.g., an algorithm may measure its accuracy through the loss function, adjusting until the error has been sufficiently minimized). The machine-learning module 111 may randomize the ordering of the training data, visualize the training data to identify relevant relationships between different variables, identify any data imbalances, and split the training data into two parts, where one part may be for training a model and the other part may be for validating the trained model, de-duplicating, normalizing, correcting errors in the training data, and so on.

In one instance, the machine-learning module 111 may be trained upon diverse datasets encompassing historical energy consumption, real-time sensors inputs, property characteristics, and environmental factors. The machine-learning module 111 may analyze historical data, real-time data, and/or attributes associated with the smart property 103 to categorize the energy usage into distinct patterns, such as efficient, moderate, or inefficient. The machine-learning module 111 may evaluate anomalies and trends in the energy usage data. For example, the machine-learning module 111 may identify excessive energy consumption by the HVAC system during non-peak times or lighting usage patterns that deviate from standard efficiency benchmarks. Using a combination of regression or clustering algorithms, the machine-learning module 111 may correlate the energy consumption with factors like occupancy, weather conditions, property types, and/or device performance for identifying specific inefficiencies within the smart property 103.

By leveraging the classified energy usage patterns and predicted inefficiencies, the machine-learning module 111 may query data source 108 for energy efficiency programs. The machine-learning module 111 may utilize natural language processing (NLP) techniques to match eligibility criteria, and may identify the most relevant programs for the property by aligning the energy inefficiencies with energy efficiency programs designed to address those specific issues. This may enable the energy optimization platform 105 to present users with tailored energy efficiency programs that may maximize potential savings and energy efficiency improvements.

In one instance, the energy optimization platform 105 may leverage machine-learning or artificial intelligence to analyze and/or track state-level energy efficiency programs, identifying where grant money is being allocated and determining its availability for the users. By processing real-time data from multiple sources, machine-learning models or artificial intelligence models may classify and map grants based on eligibility criteria, geographic location, and funding priorities. This may ensure that users can easily access relevant grant opportunities tailored to their state and needs, all available directly within the application of their user device 101, streamlining the process of securing financial incentives.

In one instance, the energy assessment module 113 may evaluate the impact of the energy efficiency programs (e.g., identified as relevant for the property (e.g., smart property 103) by the machine-learning module 111) to predict potential enhancements in energy usage efficiency. For example, each energy efficiency program may be analyzed in the context of its ability to reduce energy consumption and costs, while also considering the property's specific energy inefficiencies and infrastructure. The energy assessment module 113 may assign scores to each energy efficiency program using a scoring algorithm that may evaluate parameters such as projected energy savings, implementation costs, and/or long-term benefits.

These scores may be used to rank the energy efficiency programs, providing a clear, prioritized list of recommendations. In one example, an energy efficiency program projected to save 20% of energy may be scored higher than the one saving 10%, while lower-cost programs may be prioritized for affordability. In scenarios where energy efficiency programs receive similar scores, regional relevance (e.g., prioritizing programs that align more closely with local energy regulations or climate conditions), user preferences (e.g., factoring in specific user priorities, such as cost minimization or environmental impact), and/or ease of implementation (e.g., choosing application with simpler application processes) may be utilized to rank the energy efficiency programs. The scoring algorithm may also incorporate feedback from the machine-learning module 111, ensuring that the analysis reflects nuanced insights into the property's energy patterns and inefficiencies.

In one instance, the program matching module 115 may match the smart property 103 to one or more energy efficiency programs based upon the rankings and scores generated by the energy assessment module 113. In addition to the ranking-based matching, the program matching module 115 may evaluate energy efficiency programs based upon additional factors, such as:

(i) User's specific goals (e.g., cost savings versus energy efficiency, prioritizing renewable energy sources, focusing upon long-term investment over immediate savings, etc.);
(ii) Available user budget for implementing the energy efficiency programs;
(iii) Time constraints for implementing the energy efficiency programs;
(iv) Compatibility of the energy efficiency programs with the existing energy systems of the property;
(v) Historical success rates of the energy efficiency programs in similar properties; and/or
(vi) Health and comfort considerations.

By considering these diverse factors, the program matching module 115 may provide highly personalized, data-driven recommendations that may optimize energy savings and program selection, ensuring that users receive the most relevant, cost-effective, and sustainable program options, tailored not just to improve energy efficiency but also to fit the broader needs and preferences of the users.

In one instance, the user interface module 117 may present information in a manner that is visually appealing and easy to navigate, enabling users to effectively engage with the visualization of energy usage data, impact of the energy efficiency programs, predicted savings, and/or predicted scores (e.g., user interface 119 in the user device 101). For example, the user interface module 117 may display energy consumption patterns over time, highlighting inefficiencies or trends, as well as showing the projected impact of applying selected energy efficiency programs. The users may interact with the visual elements to drill down into specific data points, explore different scenarios, and compare the potential benefits of each energy efficiency program. By providing a comprehensive visual overview, the user interface module 117 may empower the users to make informed decisions regarding which energy efficiency programs to pursue.

In another instance, the user interface module 117 may continuously track the property's energy usage in real-time. The user interface module 117 may provide instant feedback and notifications to the users regarding any significant changes or inefficiencies in energy consumption. For example, the user interface module 117 may alert the user regarding the property's energy usage exceeding typical thresholds or if a potential issue, such as a malfunctioning appliance or HVAC inefficiency, is detected. The user interface module 117 may also incorporate a feature for users to provide feedback regarding the quality and relevance of the presentation, facilitating continuous improvement of the display.

The user interface module 117 may employ various application programming interfaces (APIs) or other function calls corresponding to the application upon the user device 101, thus enabling the display of graphics primitives such as graphs, edges, icons, menus, buttons, data entry fields, (e.g., user interfaces 102 and 119). The user interface module 117 may also comprise a variety of interfaces, for example, interfaces for data input and output devices, referred to as I/O devices, storage devices, and the like. Still further, the user interface module 117 may be configured to operate in connection with augmented reality (AR) processing techniques, wherein various applications, graphic elements, and features interact.

In one instance, the database 107 may store information regarding (i) property detail (e.g., type of property, square footage, location, energy consumption history, etc.), (ii) sensor data (e.g., real-time usage metrics for electricity, water, HVAC systems, and appliances associated with the registered property), (iii) applied energy efficiency programs (e.g., program eligibility, criteria, available incentives, geographic restrictions, etc.), and/or (iv) user profiles (e.g., preferences, energy goals, historical interactions, etc.). The database 107 may include any type of database, such as relational, hierarchical, object-oriented, and/or the like, wherein data may be organized in any suitable manner, including data tables or lookup tables. The database 107 may serve as a structured repository for storing, organizing, and managing data efficiently, enabling quick retrieval and manipulation of information. It may utilize a relational model to establish relationships between data entities, ensuring that related data can be easily accessed and queried.

In one instance, data sources 108 may include a variety of data sources that may provide data for facilitating accurate energy assessments and matching relevant energy efficiency programs to the property. The data sources 108 may include:

(i) Energy utility providers data stores: data from local energy suppliers including energy usage data and billing history;

(ii) Energy efficiency program database: a collection of energy efficiency programs from government bodies and private organizations;

(iii) Government and regulatory sources: data related to energy standards, sustainability goals, or local buildings codes that may influence the available energy efficiency program;

(iv) Property data: information about the property's physical structure, such as its size, age, insulation quality, energy-efficient appliances, and past upgrades;

(v) Historical performance data: previous energy usage data, including seasonal consumption trends and the historical impact of applied rebates or upgrades; or (v) Climate database: historical and real-time weather data that may facilitate in determining the heating and cooling needs of a property. For example, properties in cooler climates may benefit from insulation rebates, while those in warmer climates may prioritize energy-efficient cooling systems.

By incorporating these elements from the data sources 108, the computing system 100 may ensure that diverse, high-quality data are available. It should be understood that data sources 108 may include any other databases that provide relevant information pertaining to energy assessments and energy efficiency programs.

The various elements of the computing system 100 may communicate with each other through a communication network. In one instance, the user device 101 may include a network detection sensor for detecting wireless signals or receivers for different communications (e.g., Bluetooth, Wi-Fi, Li-Fi, near field communication (NFC), etc.) from the communication network. The communication network may support a variety of different communication protocols and communication techniques.

In one instance, the communication network may allow the user device 101 (or one or more user devices) to communicate with the energy optimization platform 105. The communication network may include one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

The above presented modules and components of the energy optimization platform 105 may be implemented in hardware, firmware, software, or a combination thereof. Though depicted as a separate entity in FIG. 1, it is contemplated that the energy optimization platform 105 may be implemented for direct operation by the respective user device 101. As such, the energy optimization platform 105 may generate direct signal inputs by way of the operating system of the user device 101. In one instance, one or more of the modules 109-117 may be implemented for operation by the respective user device 101, as the energy optimization platform 105. The various executions presented herein contemplate any and all arrangements and models.

Exemplary Energy Efficiency Program Matching Flowchart

Figure 2A:
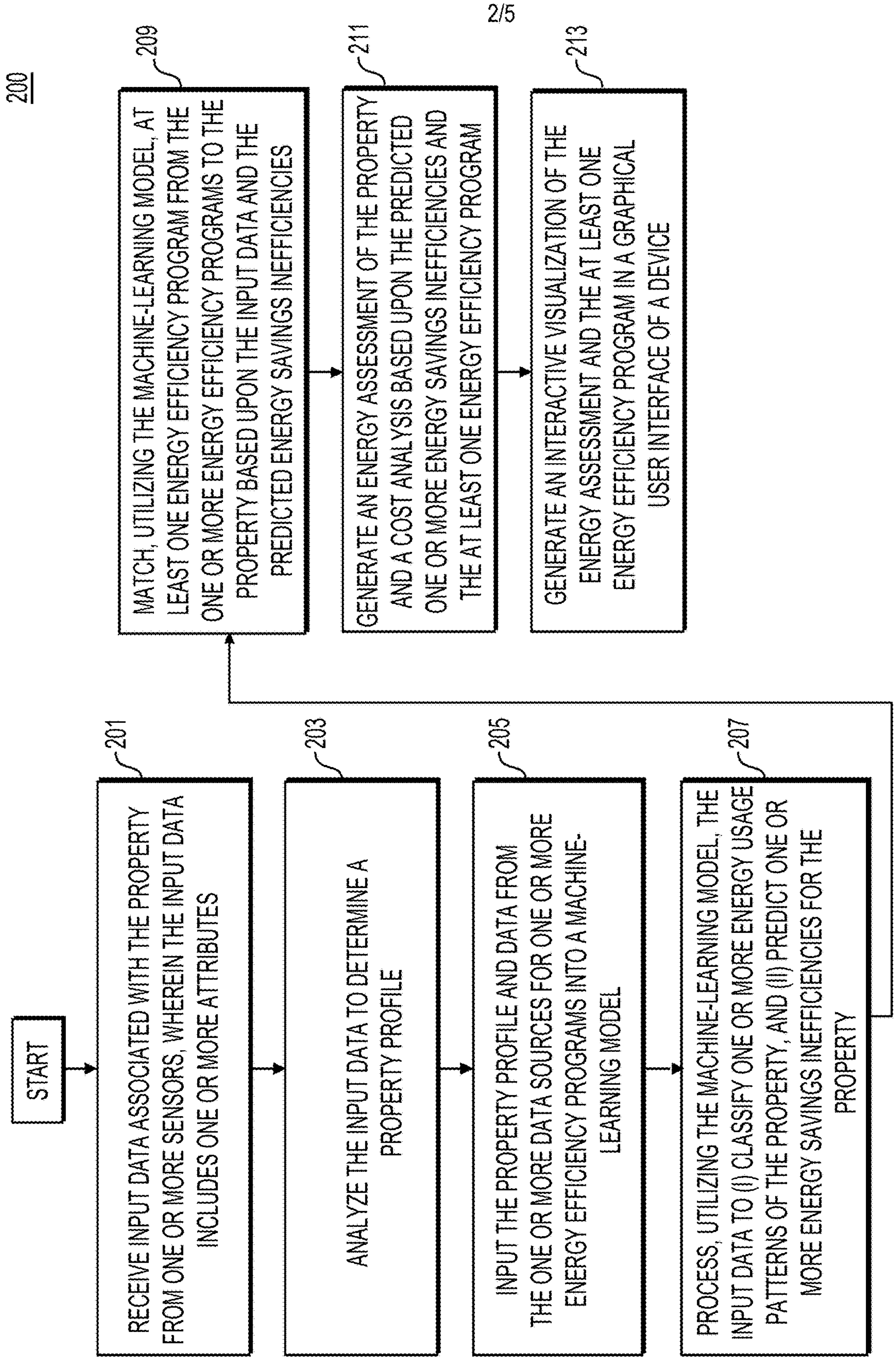
FIG. 2A is an exemplary flowchart of a computer-implemented or computer-based process for energy optimization and identifying an energy efficiency program for a property, according to one or more embodiments.
Figure 4:
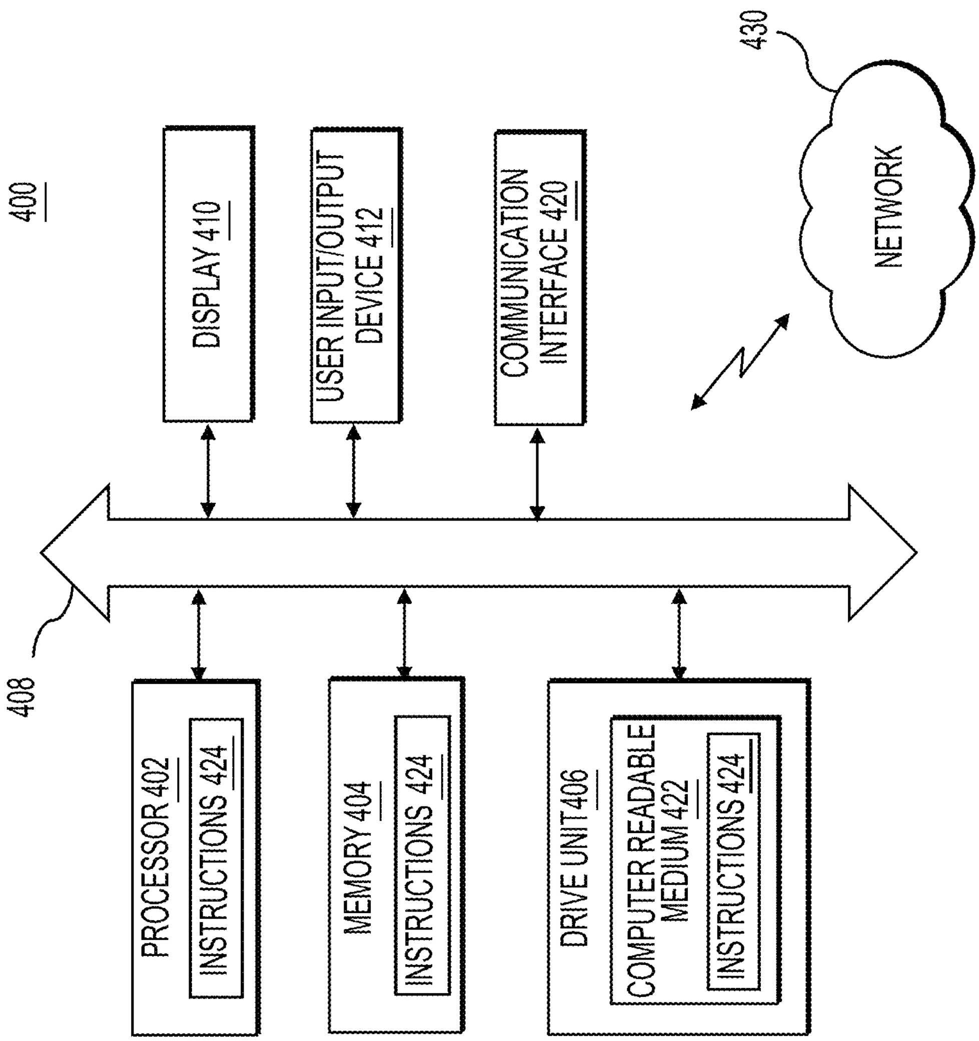
FIG. 4 illustrates an implementation of an exemplary computer system that executes one or more techniques presented herein.

FIG. 2A is an exemplary flowchart of a computer-implemented or computer-based process for energy optimization and identifying an energy efficiency program for a property. In one instance, the energy optimization platform 105 and/or any of the modules 109-117 may perform one or more portions of the process 200 and are implemented using, for instance, a chip set including a processor (e.g., processor 402) and a memory (e.g., memory 404) as shown in FIG. 4. As such, the energy optimization platform 105 and/or any of modules 109-117 may be configured to facilitate accomplishing various parts of the process 200, as well as accomplishing embodiments of other processes described herein in conjunction with other components of the computing system 100. Although the process 200 is illustrated and described as a sequence of actions, operations, and/or functionality, it is contemplated that various embodiments of the process 200 may be performed in any order or combination and need not include all of the illustrated actions, operations, and/or functionality.

In block 201, the energy optimization platform 105 may receive input data associated with the property (e.g., smart property 103) from one or more sensors (e.g., sensors 104). The input data may include one or more attributes associated with the property, such as (i) historical energy usage data, (ii) real-time energy consumption data captured by one or more sensors, and/or (iii) one or more location-specific attributes of the property (e.g., size (square footage), type (residential or commercial), age (year built), geographic location (city, state, region), energy system type (solar panels, HVAC system), construction material, number of occupants, existing energy certifications, etc.).

In block 203, the energy optimization platform 105 may analyze the input data to determine a property profile. A property profile may include a comprehensive representation of a property's energy-related characteristics, derived from input data. The property profile may consolidate information about the property's physical structure, demographic information (e.g., number of residents), and its energy usage patterns over time. The property profile may also take into account external factors, such as a geographic location and climate, which may impact the energy usage. In some embodiments, the energy optimization platform 105 may determine that a property profile already exists. In such situations, the energy optimization platform 105 may retrieve the property profile from one or more data stores, and then update the property profile.

In block 205, the energy optimization platform 105 may input the property profile and data from one or more data sources (e.g., data sources 108) for one or more energy efficiency programs into a machine-learning model. The energy optimization platform 105 may retrieve data from the one or more data sources, where the retrieving may include identifying the one or more data sources that are relevant to the property profile. For example, the data sources may correspond to the property's location, climate, owner's information, and the like.

In block 207, the energy optimization platform 105 may process, utilizing the machine-learning model, the input data to (i) classify one or more energy usage patterns of the property, and/or (ii) predict one or more energy savings inefficiencies for the property.

In one instance, the energy optimization platform 105 may analyze, utilizing the machine-learning model, historical energy consumption data associated with one or more properties of a similar size, a similar location, and/or a similar type against real-time energy consumption data associated with the property (e.g., smart property 103). The energy optimization platform 105 may classify, utilizing the machine-learning model, the energy usage patterns of the property into one or more categories. The one or more categories may include (i) a high-efficiency property category indicating one or more optimized energy consumption patterns, (ii) a moderate-efficiency property category indicating one or more standard energy consumption patterns with one or more minor inefficiencies, and/or (iii) a low-efficiency property category indicating an excessive energy consumption.

In another instance, the energy optimization platform 105 may determine, utilizing the machine-learning model, energy consumption patterns of the property as deviating from optimal energy usage patterns. The energy optimization platform 105 may identify, utilizing the machine-learning model, the energy consumption patterns of the property as energy savings inefficient.

In block 209, the energy optimization platform 105 may match, utilizing the machine-learning model, at least one energy efficiency program from one or more energy efficiency programs to the property based upon the input data and the predicted one or more energy savings inefficiencies. The energy efficiency program may include (i) a financial assistance for upgrading one or more energy-efficient appliances, (ii) a tax credit or deduction for implementing one or more energy-saving improvements, (iii) a subsidy for installation of one or more renewable energy systems, (iv) a discount upon an energy-efficient home insulation, and/or (v) financing options for purchasing an energy-efficient equipment with one or more reduced interest rates.

In one instance, the energy optimization platform 105 may analyze eligibility criteria for one or more energy efficiency programs. The eligibility criteria may include location data, property type, or one or more energy usage requirements. The energy optimization platform 105 may compare attribute data, one or more energy usage patterns, or the predicted one or more energy savings inefficiencies associated with the property to the eligibility criteria. The energy optimization platform 105 may select at least one energy efficiency program that aligns with the attribute data, one or more energy usage patterns, or the predicted one or more energy savings inefficiencies associated with the property.

In one instance, the energy optimization platform 105 may analyze local climate patterns and seasonal variations from the data sources 108 to predict the influence upon one or more energy usage patterns of the property. The energy optimization platform 105 may identify at least one energy efficiency program that specializes upon energy-saving upgrades during such environmental conditions, and may generate a recommendation of at least one energy efficiency program in the user device 101 to optimize energy efficiency. The energy optimization platform 105 may determine an environmental benefit for implementing at least one energy efficiency program. The environmental benefits may include a reduced carbon footprint, a reduced energy wastage, and/or an alignment with one or more renewable energy utilization goals. The energy optimization platform 105 may assign a score indicating a contribution by the property to environmental conservation and energy efficiency.

In block 211, the energy optimization platform 105 may generate an energy assessment of the property and a cost analysis based upon the predicted one or more energy savings inefficiencies and at least one energy efficiency program. In one instance, the energy optimization platform 105 may simulate an impact of at least one energy efficiency program based upon the predicted one or more energy savings inefficiencies. The energy optimization platform 105 may estimate a reduction in one or more of (i) one or more energy inefficiencies, (ii) the energy usage, and/or (iii) one or more associated costs. The energy optimization platform 105 may generate a comparative analysis between a current energy profile of the property and a predicted energy profile of the property after implementing at least one energy efficiency program. In one instance, the cost analysis may include a calculation of expected savings, one or more payback periods, and a return upon investments for implementing one or more upgrades.

In block 213, the energy optimization platform 105 may generate an interactive visualization of the energy assessment and at least one energy efficiency program in a graphical user interface of a device (e.g., user interface 119). The visualization may dynamically update based upon real-time data received from the one or more sensors corresponding to energy usage.

In one instance, the energy optimization platform 105 may determine the completion of one or more actions recommended by at least one energy efficiency program by a user. The one or more actions may include (i) purchasing and installing one or more energy-efficient products, (ii) completing a home energy evaluation, (iii) sharing energy usage data for tracking and analysis, (iv) adhering to timelines specified by the at least one energy efficiency program, (v) participating in educational programs or workshops related to the energy savings offered by the at least one energy efficiency program, (vi) referring other users to the at least one energy efficiency program, and/or (vii) sharing feedback or reviews upon effectiveness of energy-saving upgrades.

The energy optimization platform 105 may provide one or more rewards to the user for completing one or more actions. The one or more rewards may include (i) one or more loyalty points redeemable for one or more energy-efficient products or one or more services, (ii) one or more discounts upon one or more future energy-efficient upgrades, (iii) a membership program offering one or more personalized energy savings consultations, and/or (iv) one or more tiered benefits based upon one or more energy savings milestones achieved.

Exemplary Energy Efficiency Flowchart

Figure 2B:
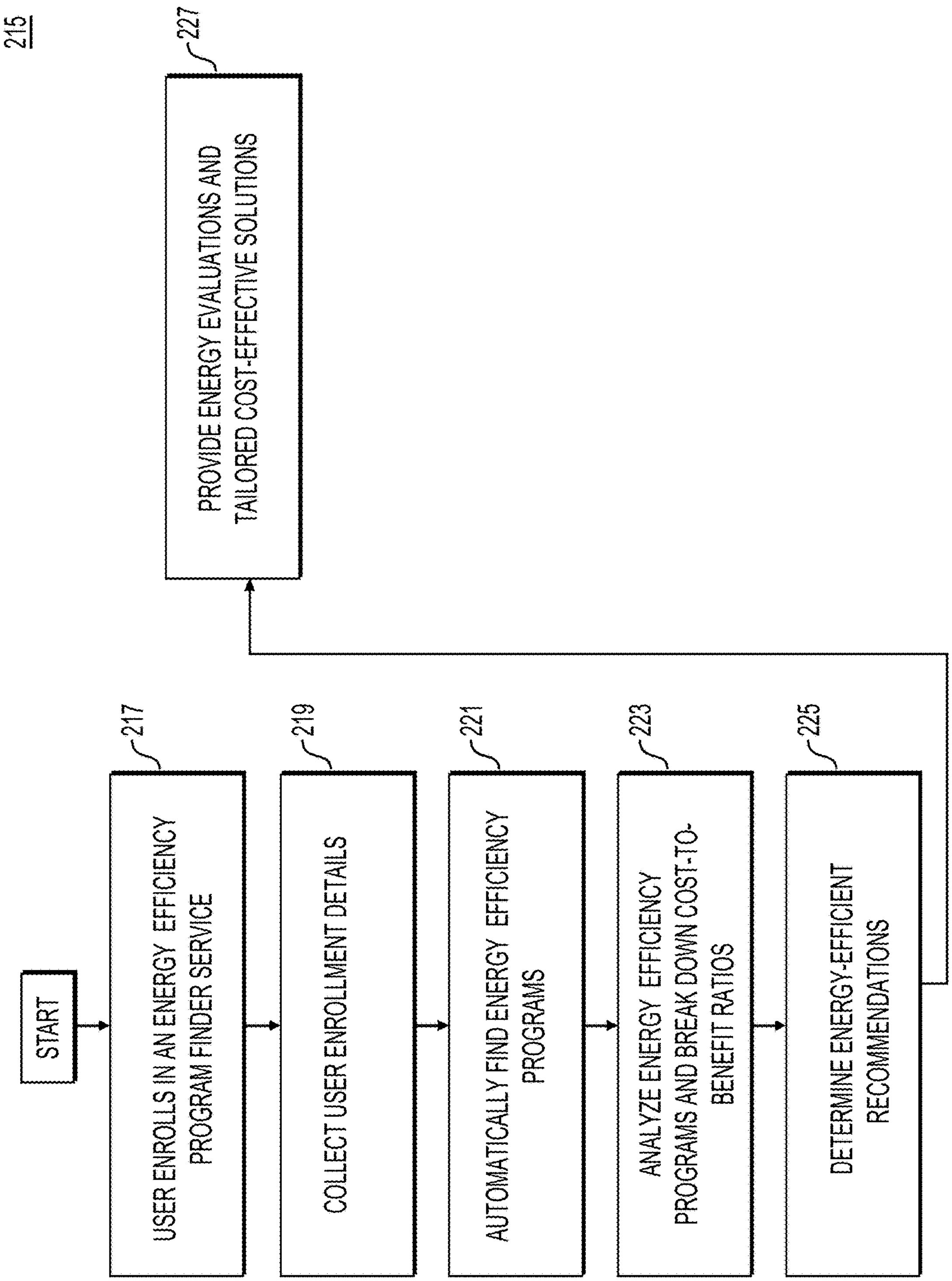
FIG. 2B is an exemplary flowchart of a computer-implemented or computer-based process for analyzing property-specific energy data, identifying an optimal energy efficiency program, recommending efficiency upgrades, and delivering cost-benefit analysis, according to one or more embodiments.

FIG. 2B is an exemplary flowchart of a computer-implemented or computer-based process for analyzing property-specific energy data, identifying an optimal energy efficiency program, recommending efficiency upgrades, and delivering cost-benefit analysis. In one instance, the energy optimization platform 105 and/or any of the modules 109-117 may perform one or more portions of the process 215 and may be implemented using, for instance, a chip set including a processor (e.g., processor 402) and a memory (e.g., memory 404) as shown in FIG. 4. As such, the energy optimization platform 105 and/or any of modules 109-117 may be configured to facilitate accomplishing various parts of the process 215, as well as accomplishing embodiments of other processes described herein in conjunction with other components of the computing system 100. Although the process 215 is illustrated and described as a sequence of actions, operations, and/or functionality, it is contemplated that various embodiments of the process 215 may be performed in any order or combination and need not include all of the illustrated actions, operations, and/or functionality.

In block 217, the energy optimization platform 105 (e.g., the energy efficiency program finder service) may begin the process with initiating and/or displaying a user-friendly enrollment system, where users (e.g., owners of a house (e.g., smart property 103) wanting to save on utilities may enroll through the user device 101. For example, a user may create an account by providing a username, a password, and other relevant personal information to the energy optimization platform 105 to build a profile. The energy optimization platform 105 may then guide the user through a series of steps to collect other relevant information for building a comprehensive profile, such as requesting basic contact information (e.g., name, email address, phone number, and/or mailing address), preference information (e.g., type of energy efficiency programs they are interested in, such as solar energy programs, home weatherization, lighting upgrades, water conservation, etc.), and the like.

In block 219, the energy optimization platform 105 may collect comprehensive data from the user(s) and/or various data sources. In one instance, the users may provide, via user device 101, essential information about their property, including location data, house attributes, energy consumption patterns, and/or current utility providers. In another instance, the energy optimization platform 105 may collect essential information on the property associated with the users from various data sources (e.g., database 107, data sources 108). By analyzing the collected data, the energy optimization platform 105 may tailor its services to each household's unique energy needs.

In block 221, the energy optimization platform 105 may employ an advanced querying system to scour a comprehensive database of national, regional, and local energy efficiency programs (e.g., data sources 108). For example, the energy optimization platform 105 may access the national database of energy incentives, which aggregates and categorizes available rebates, tax credits, and/or other financial incentives for energy-efficient home improvement. The energy optimization platform 105 may utilize trained machine-learning models to process the collected information (e.g., location data, energy consumption patterns, current utility providers, and/or property details) to match one or more optimal energy efficiency programs. For instance, if the homeowner's air conditioner is outdated and needs replacement, the energy optimization platform 105 may identify energy efficiency programs specifically designed to offset the cost of upgrading to an energy-efficient model. The energy optimization platform 105 may further evaluate one or more optimal energy efficiency programs to identify the most beneficial financial programs, breaking down the associated costs and savings. This may ensure that users seeking to save money on necessary replacements can make informed decisions and maximize their financial benefits without sifting through complex and scattered information.

In block 223, the energy optimization platform 105 may analyze one or more energy efficiency programs to evaluate potential savings against the cost of implementing the suggested upgrades. For example, the energy optimization platform 105 may identify relevant financial options, offering customized solutions that may maximize savings and reduce the cost of energy-related upgrades. Whether through low-interest financing, payment plans, or outright grants, the energy optimization platform 105 may ensure that users can make energy-efficient improvements affordably. The analysis may incorporate cost-to-benefit ratios, prioritizing programs that may offer the highest return on investments (ROI). The energy optimization platform 105 may also provide a visual breakdown of the energy efficiency process, showing both upfront costs and projected long-term savings, assisting the users in making informed decisions.

In block 225, the energy optimization platform 105 may use the collected data to suggest energy-efficient upgrades for the house, such as appliances with high energy ratings, energy-efficient lighting options, and/or water-saving devices. The recommendations may be personalized based on the house's unique characteristics, such as size, age, and/or energy usage patterns. Additionally, the energy optimization platform 105 may emphasize the environmental benefits of each upgrade, like reducing the carbon footprint and/or energy consumption. In one example, an energy-conscious homeowner may desire to improve the house's efficiency, and the energy optimization platform 105 may recommend specific energy-efficient upgrades tailored to the homeowner's property. These recommendations may include upgrading appliances to energy-saving appliances, adopting advanced lighting solutions, and/or incorporating water-saving technologies. The energy optimization platform 105 may perform a cost-to-benefit analysis for each recommendation, comparing the potential energy savings to the needed investment. This may allow users to clearly understand the long-term advantages of making these upgrades, empowering users to enhance their home's efficiency while staying within budget.

In one instance, the energy optimization platform 105 may assess the property's current energy usage and identify areas of inefficiency. Recognizing that the users may be on a budget and may need to reduce energy costs, the energy optimization platform 105 may prioritize cost-effective solutions that may align with the user's financial constraints. Using advanced analytics, the energy optimization platform 105 may provide personalized insights into actions that may significantly lower energy consumption and expenses. Coupled with the identified energy efficiency programs, the energy optimization platform 105 may deliver tailored recommendations, outlining step-by-step strategies to achieve energy savings.

In block 227, the energy optimization platform 105 may identify inefficiencies and areas for reducing the energy usage. This assessment may use predictive analytics to simulate the impact of applying energy-efficient upgrades and rebates. The energy optimization platform 105 may suggest renewable energy options, such as solar panels, and show their potential impact on a home's energy bills and overall sustainability. The energy optimization platform 105 may also generate a comprehensive report for the user, highlighting the most cost-effective solutions based on their energy needs and the available rebates. The report may include clear actionable steps to apply for rebates, which may include instructions on how to make upgrades. The user may compare different upgrade options, view projected savings, and understand the environmental impact of the decisions.

In such a manner, the energy optimization platform 105 may offer a holistic approach to reducing energy costs and improving efficiency by combining data aggregation and advanced analysis to deliver tailored recommendations for homeowners. Starting with an initial energy assessment of the property, the energy optimization platform 105 may identify areas of inefficiencies and highlight opportunities for cost-effective upgrades. By analyzing price breakpoints and evaluating potential savings, the energy optimization platform 105 may match users with available energy efficiency programs, providing money-back options that may offset the cost of improvements. This comprehensive strategy goes beyond a singular focus, addressing various energy types to ensure a wide range of energy-saving solutions tailored to the user's needs. By integrating real-time data, cost-benefit analysis, and/or actionable suggestions, the energy optimization platform 105 may empower users to make informed decisions that may optimize energy use and reduce expenses.

Many energy efficiency programs go unused simply because users (e.g., homeowners) and even contractors are unaware of the program's existence, particularly those offered by manufacturers or tied to specific appliances and products. These hidden opportunities often remain untapped, even as competitors within the same market provide similar incentives. The energy optimization platform 105 may leverage trained machine-learning models to uncover and aggregate these lesser-known energy efficiency programs, enabling users to compare options and make informed decisions about which programs or products offer the best value. By analyzing government grant data, the energy optimization platform 105 may identify which states are actively utilizing available funding and where untapped resources remain, ensuring that users are directed to the most accessible and beneficial energy efficiency programs in the user's area. This not only simplifies the decision-making process but also ensures that users maximize their savings and energy efficiency.

Exemplary Machine-Learning Techniques

Figure 3:
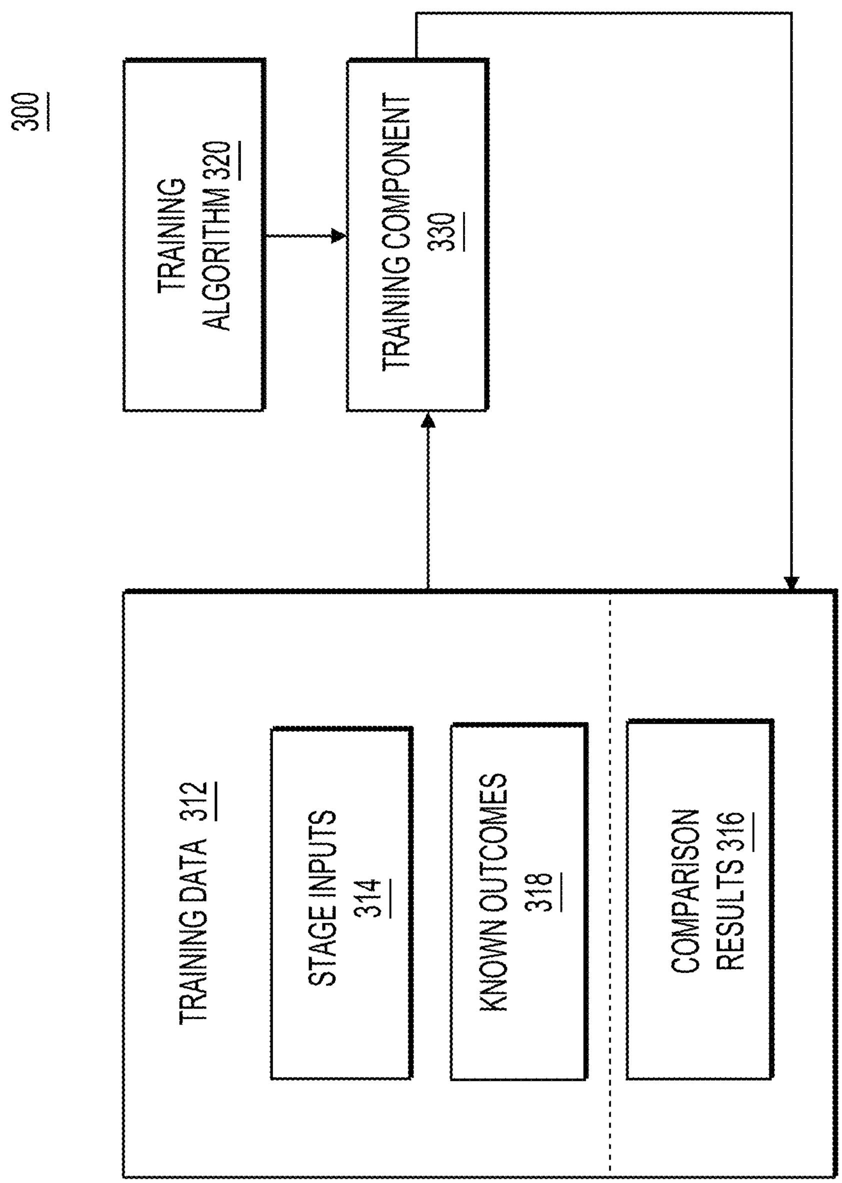
FIG. 3 shows an exemplary machine-learning training flow chart, according to one or more embodiments.

One or more implementations disclosed herein may include and/or may be implemented using a machine-learning model. For example, one or more of the modules of the energy optimization platform 105 may be implemented using a machine-learning model and/or may be used to train the machine-learning model. A given machine-learning model may be trained using the data flow 300 of FIG. 3. Training data 312 may include one or more of stage inputs 314 and known outcomes 318 related to the machine-learning model to be trained. The stage inputs 314 may be from any applicable source including text, visual representations, data, values, comparisons, stage outputs, e.g., one or more outputs from one or more actions or operations from FIG. 2A. The known outcomes 318 may be included for the machine-learning models generated based upon supervised or semi-supervised training. An unsupervised machine-learning model may not be trained using known outcomes 318. Known outcomes 318 may include known or desired outputs for future inputs similar to, or in the same category as, stage inputs 314 that do not have corresponding known outputs.

The training data 312 and a training algorithm 320, e.g., one or more of the modules implemented using the machine-learning model and/or may be used to train the machine-learning model, may be provided to a training component 330 that may apply the training data 312 to the training algorithm 320 to generate the machine-learning model. According to an implementation, the training component 330 may be provided comparison results 316 that compare a previous output of the corresponding machine-learning model to apply the previous result to re-train the machine-learning model. The comparison results 316 may be used by training component 330 to update the corresponding machine-learning model. The training algorithm 320 may utilize machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, models specifically discussed in the present disclosure, or the like.

The machine-learning model used herein may be trained and/or used by adjusting one or more weights and/or one or more layers of the machine-learning model. For example, during training, a given weight may be adjusted (e.g., increased, decreased, removed) based upon training data or input data. Similarly, a layer may be updated, added, or removed based upon training data/and or input data. The resulting outputs may be adjusted based upon the adjusted weights and/or layers.

In general, any process or operation discussed in this disclosure is understood to be computer-implementable, such as the processes illustrated in FIG. 2A may be performed by one or more processors of a computer system as described herein. A process or process action or operation performed by one or more processors may also be referred to as an operation. The one or more processors may be configured to perform such processes by having access to instructions (e.g., software or computer-readable code) that, when executed by one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

Exemplary Computing Environment

In general, any process or operation discussed in this disclosure is understood to be computer-implementable, such as the processes illustrated in FIG. 2A and may be performed by one or more processors of a computer system as described herein. A process or process action or operation performed by one or more processors may also be referred to as an operation. The one or more processors may be configured to perform such processes by having access to instructions (e.g., software or computer-readable code) that, when executed by one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

FIG. 4 illustrates an implementation of a computer system that may execute techniques presented herein. The computer system 400 may include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a personal digital assistant (PDA), a mobile device, a palmtop computer, a laptop computer, a desktop computer, a web appliance, or any other machine capable of executing a set of instructions (sequential or otherwise) that specify actions to be taken by that machine. In a particular implementation, the computer system 400 may be implemented using electronic devices that provide voice, video, or data communication. Further, while the computer system 400 is illustrated as a single system, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 404 may include a cache or random-access memory for the processor 402. In alternative implementations, the memory 404 is separate from the processor 402, such as a cache memory of a processor, the system memory, or other memory.

The memory 404 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the processor 402 executing the instructions stored in the memory 404. The functions, acts, or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing, and the like.

As shown, the computer system 400 may further include a display 410, such as a liquid crystal display (LCD), an organic light emitting diode (OLED), a flat panel display, a solid-state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 406.

Additionally or alternatively, the computer system 400 may include an input/output device 412 configured to allow a user to interact with any of the components of the computer system 400. The input/output device 412 may be a number pad, a keyboard, or a cursor control device, such as a mouse, or a joystick, touch screen display, remote control, or any other device operative to interact with the computer system 400.

The computer system 400 may also or alternatively include drive unit 406 implemented as a disk or optical drive. The drive unit 406 may include a computer-readable medium 422 in which one or more sets of instructions 424, e.g., software, can be embedded. Further, instructions 424 may embody one or more of the methods or logic as described herein. The instructions 424 may reside completely or partially within the memory 404 and/or within the processor 402 during execution by the computer system 400. The memory 404 and the processor 402 also may include computer-readable media as discussed above.

In some systems, computer-readable medium 422 may include the set of instructions 424 or receive and execute the set of instructions 424 responsive to a propagated signal so that a device connected to network 430 can communicate voice, video, audio, images, or any other data over the network 430. Further, the set of instructions 424 may be transmitted or received over the network 430 via communication port or interface 420, and/or using bus 408. The communication port or interface 420 may be a part of the processor 402 or may be a separate component. The communication port or interface 420 may be created in software or may be a physical connection in hardware.

The communication port or interface 420 may be configured to connect with a network 430, external media, the display 410, or any other components in computer system 400, or combinations thereof. The connection with the network 430 may be a physical connection, such as a wired Ethernet connection or may be established wirelessly as discussed below. Likewise, the additional connections with other components of the computer system 400 may be physical connections or may be established wirelessly. The network 430 may alternatively be directly connected to the bus 408.

While the computer-readable medium 422 is shown to be a single medium, the term "computer-readable medium"

may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that causes a computer system to perform any one or more of the methods or operations disclosed herein. The computer-readable medium 422 may be non-transitory, and may be tangible.

The computer-readable medium 422 may include a solid-state memory such as a memory card or other package that houses one or more non-volatile read-only memories. The computer-readable medium 422 can be a random-access memory or other volatile re-writable memory. Additionally or alternatively, the computer-readable medium 422 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations may broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Computer system 400 may be connected to network 430. The network 430 may define one or more networks including wired or wireless networks. The wireless network may be a cellular telephone network, an 802.10, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 430 may include wide area networks (WAN), such as the Internet, local area networks (LAN), campus area networks, metropolitan area networks, a direct connection such as through a Universal Serial Bus (USB) port, or any other networks that may allow for data communication.

The network 430 may be configured to couple one computing device to another computing device to enable communication of data between the devices. The network 430 may generally be enabled to employ any form of machine-readable media for communicating information from one device to another. The network 430 may include communication methods by which information may travel between computing devices.

The network 430 may be divided into sub-networks. The sub-networks may allow access to all of the other components connected thereto or the sub-networks may restrict access between the components. The network 430 may be regarded as a public or private network connection and may include, for example, a virtual private network or an encryption or other security mechanism employed over the public Internet, or the like.

EXEMPLARY EMBODIMENT

A computer-implemented method for energy optimization and identifying an energy efficiency program for a property may be provided. The computer-implemented method may be performed by one or more local or remote processors of a computing system in communication with one or more local or remote data sources. The computer-implemented method may include: (1) receiving, by the one or more processors, input data associated with the property from one or more sensors, wherein the input data may include one or more attributes; (2) analyzing, by the one or more processors, the input data to determine a property profile; (3) inputting, by the one or more processors, the property profile and data from the one or more data sources for one or more energy efficiency programs into a machine-learning model; (4) in response to the inputting, processing, by the one or more processors utilizing the machine-learning model, the input data to (i) classify one or more energy usage patterns of the property, and/or (ii) predict one or more energy savings inefficiencies for the property; (5) matching, by the one or more processors utilizing the machine-learning model, at least one energy efficiency program from the one or more energy efficiency programs to the property based upon the input data and the predicted one or more energy savings inefficiencies; (6) generating, by the one or more processors, an energy assessment of the property and a cost analysis based upon the predicted one or more energy savings inefficiencies and the at least one energy efficiency program; and/or (7) generating, by the one or more processors, an interactive visualization of the energy assessment and the at least one energy efficiency program in a graphical user interface of a device. Additionally or alternatively, the visualization may dynamically update based upon real-time data received from the one or more sensors corresponding to energy usage.

In some embodiments, the voice bots or chatbots may be configured to utilize AI and/or ML techniques, such as for input or output devices. For instance, a voice bot or chatbot may be a ChatGPT chatbot, an InstructGPT bot, a Codex bot, or a Google Bard bot. The voice bot or chatbot may employ supervised or unsupervised ML techniques, which may be followed by, and/or used in conjunction with, reinforced or reinforcement learning techniques. The voice bot or chatbot may employ the techniques utilized for ChatGPT, InstructGPT bot, Codex bot, or Google Bard bot.

In certain aspects, classifying the one or more energy usage patterns of the property may include (i) analyzing, by the one or more processors utilizing the machine-learning model, historical energy consumption data associated with one or more properties of a similar size, a similar location, or a similar type with real-time energy consumption data associated with the property; and/or (ii) classifying, by the one or more processors utilizing the machine-learning model, the one or more energy usage patterns of the property into one or more categories.

Additionally or alternatively, the one or more categories may include (i) a high-efficiency property category indicating one or more optimized energy consumption patterns, (ii) a moderate-efficiency property category indicating one or more standard energy consumption patterns with one or more minor inefficiencies, and/or (iii) a low-efficiency property category indicating an excessive energy consumption.

In some embodiments, predicting the one or more energy savings inefficiencies may include (i) determining, by the one or more processors utilizing the machine-learning model, one or more energy consumption patterns as deviating from one or more optimal energy usage patterns; and/or (ii) identifying, by the one or more processors utilizing the machine-learning model, the one or more energy consumption patterns as energy savings inefficient.

In certain embodiments, matching the at least one energy efficiency program to the property may include (i) analyzing, by the one or more processors, one or more eligibility criteria for the one or more energy efficiency programs, wherein the one or more eligibility criteria may include location data, property type, or one or more energy usage requirements; (ii) comparing, by the one or more processors, attribute data, the one or more energy usage patterns, or the predicted one or more energy savings inefficiencies associated with the property to the one or more eligibility criteria; and/or (iii) selecting, by the one or more processors, the at least one energy efficiency program that aligns with the attribute data, the one or more energy usage patterns, or the predicted one or more energy savings inefficiencies associated with the property.

In various embodiments, generating the energy assessment of the property may include (i) simulating, by the one or more processors, an impact of the at least one energy efficiency program based upon the predicted one or more energy savings inefficiencies; (ii) estimating, by the one or more processors, a reduction in one or more of (a) one or more energy inefficiencies, (b) the energy usage, or (c) one or more associated costs; and/or (iii) generating, by the one or more processors, a comparative analysis between a current energy profile of the property and a predicted energy profile of the property after implementing the at least one energy efficiency program.

Additionally or alternatively, the input data may include one or more of (i) historical energy usage data, (ii) real-time energy consumption data captured by the one or more sensors, and/or (iii) one or more location-specific attributes of the property.

In some embodiments, the cost analysis may include (i) a calculation of expected savings, (ii) one or more payback periods, and/or (iii) a return upon investments for implementing one or more upgrades.

In certain aspects, the at least one energy efficiency program may include one or more of (i) a financial assistance for upgrading one or more energy-efficient appliances, (ii) a tax credit or deduction for implementing one or more energy-saving improvements, (iii) a subsidy for installation of one or more renewable energy systems, (iv) a discount upon an energy-efficient home insulation, and/or (v) financing options for purchasing an energy-efficient equipment with one or more reduced interest rates.

In certain embodiments, providing one or more rewards may include (i) determining, by the one or more processors, a completion of one or more actions recommended by the at least one energy efficiency program by a user; and/or (ii) providing, by the one or more processors, one or more rewards to the user.

Additionally or alternatively, the one or more rewards may include one or more of (i) one or more loyalty points redeemable for one or more energy-efficient products or one or more services, (ii) one or more discounts upon one or more future energy-efficient upgrades, (iii) a membership program offering one or more personalized energy savings consultations, and/or (iv) one or more tiered benefits based upon one or more energy savings milestones achieved.

In various embodiments, the one or more actions may include one or more of (i) purchasing and installing the one or more energy-efficient products, (ii) completing a home energy evaluation, (iii) sharing energy usage data for tracking and analysis, (iv) adhering to timelines specified by the at least one energy efficiency program, (v) participating in educational programs or workshops related to the energy savings offered by the at least one energy efficiency program, (vi) referring other users to the at least one energy efficiency program, and/or (vii) sharing feedback or reviews upon effectiveness of energy-saving upgrades.

In some embodiments, matching the at least one energy efficiency program may include (i) analyzing, by the one or more processors, local climate patterns and seasonal variations to predict their influence upon the one or more energy usage patterns of the property; (ii) identifying, by the one or more processors, the at least one energy efficiency program that specializes upon energy-saving upgrades during such environmental conditions; and/or (iii) generating, by the one or more processors, a recommendation of the at least one energy efficiency program to optimize energy efficiency.

In certain aspects, assigning a score may include (i) determining, by the one or more processors, an environmental benefit of implementing the at least one energy efficiency program; and/or (ii) assigning, by the one or more processors, a score indicating a contribution by the property to an environmental conservation and an energy efficiency.

Additionally or alternatively, the environmental benefit may include (i) a reduced carbon footprint, (ii) a reduced energy wastage, and/or (iii) an alignment with one or more renewable energy utilization goals.

A computer system for energy optimization and identifying an energy efficiency program for a property may be provided. The computer system may include one or more processors of a computing system, and at least one non-transitory computer readable medium storing instructions which, when executed by the one or more processors, cause the one or more processors to perform operations. The computer system may perform operations including (1) receiving input data associated with the property from one or more sensors, wherein the input data may include one or more attributes; (2) analyzing the input data to determine a property profile; (3) inputting the property profile and data from the one or more data sources for one or more energy efficiency programs into a machine-learning model; (4) in response to the inputting, processing, utilizing the machine-learning model, the input data to (i) classify one or more energy usage patterns of the property, and (ii) predict one or more energy savings inefficiencies for the property; (5) matching, utilizing the machine-learning model, at least one energy efficiency program from the one or more energy efficiency programs to the property based upon the input data and the predicted one or more energy savings inefficiencies; (6) generating an energy assessment of the property and a cost analysis based upon the predicted one or more energy savings inefficiencies and the at least one energy efficiency program; and/or (7) generating an interactive visualization of the energy assessment and the at least one energy efficiency program in a graphical user interface of a device. Additionally or alternatively, the visualization may dynamically update based upon real-time data received from the one or more sensors corresponding to energy usage.

In certain aspects, classifying the one or more energy usage patterns of the property may include (i) analyzing, utilizing the machine-learning model, historical energy consumption data associated with one or more properties of a similar size, a similar location, or a similar type with real-time energy consumption data associated with the property; and/or (ii) classifying, utilizing the machine-learning model, the one or more energy usage patterns of the property into one or more categories.

Additionally or alternatively, the one or more categories may include (i) a high-efficiency property category indicating one or more optimized energy consumption patterns, (ii) a moderate-efficiency property category indicating one or more standard energy consumption patterns with one or more minor inefficiencies, and/or (iii) a low-efficiency property category indicating an excessive energy consumption.

In some embodiments, predicting the one or more energy savings inefficiencies may include (i) determining, utilizing the machine-learning model, one or more energy consumption patterns as deviating from one or more optimal energy usage patterns; and/or (ii) identifying, utilizing the machine-learning model, the one or more energy consumption patterns as energy savings inefficient.

In certain embodiments, matching the at least one energy efficiency program to the property may include (i) analyzing one or more eligibility criteria for the one or more energy efficiency programs, wherein the one or more eligibility criteria may include location data, property type, or one or more energy usage requirements; (ii) comparing attribute data, the one or more energy usage patterns, or the predicted one or more energy savings inefficiencies associated with the property to the one or more eligibility criteria; and/or (iii) selecting the at least one energy efficiency program that aligns with the attribute data, the one or more energy usage patterns, or the predicted one or more energy savings inefficiencies associated with the property.

In some embodiments, generating the energy assessment of the property may include (i) simulating an impact of the at least one energy efficiency program based upon the predicted one or more energy savings inefficiencies; (ii) estimating a reduction in one or more of (a) one or more energy inefficiencies, (b) the energy usage, or (c) one or more associated costs; and/or (iii) generating a comparative analysis between a current energy profile of the property and a predicted energy profile of the property after implementing the at least one energy efficiency program.

A non-transitory computer readable medium for energy optimization and identifying an energy efficiency program for a property may be provided. The non-transitory computer readable medium may store instructions which, when executed by one or more processors, cause the one or more processors to perform operations. The one or more processors may perform operations including (1) receiving input data associated with the property from one or more sensors, wherein the input data may include one or more attributes; (2) analyzing the input data to determine a property profile; (3) inputting the property profile and data from the one or more data sources for one or more energy efficiency programs into a machine-learning model; (4) in response to the inputting, processing, utilizing the machine-learning model, the input data to (i) classify one or more energy usage patterns of the property, and (ii) predict one or more energy savings inefficiencies for the property; (5) matching, utilizing the machine-learning model, at least one energy efficiency program from the one or more energy efficiency programs to the property based upon the input data and the predicted one or more energy savings inefficiencies; (6) generating an energy assessment of the property and a cost analysis based upon the predicted one or more energy savings inefficiencies and the at least one energy efficiency program; and/or (7) generating an interactive visualization of the energy assessment and the at least one energy efficiency program in a graphical user interface of a device. Additionally or alternatively, the visualization may dynamically update based upon real-time data received from the one or more sensors corresponding to energy usage.

In certain aspects, classifying the one or more energy usage patterns of the property may include (i) analyzing, utilizing the machine-learning model, historical energy consumption data associated with one or more properties of a similar size, a similar location, or a similar type with real-time energy consumption data associated with the property; and/or (ii) classifying, utilizing the machine-learning model, the one or more energy usage patterns of the property into one or more categories.

Additionally or alternatively, the one or more categories may include (i) a high-efficiency property category indicating one or more optimized energy consumption patterns, (ii) a moderate-efficiency property category indicating one or more standard energy consumption patterns with one or more minor inefficiencies, and/or (iii) a low-efficiency property category indicating an excessive energy consumption.

In certain embodiments, predicting the one or more energy savings inefficiencies may include (i) determining, utilizing the machine-learning model, one or more energy consumption patterns as deviating from one or more optimal energy usage patterns; and/or (ii) identifying, utilizing the machine-learning model, the one or more energy consumption patterns as energy savings inefficient.

ADDITIONAL CONSIDERATIONS

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the actions, operations, and/or functionality of computer-implemented methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Finally, unless a claim element is defined by expressly reciting the word "means" and a function without the recital of any structure, it is not intended that the scope of any claim element be interpreted based upon the application of 35 U.S.C. § 112 (f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied upon a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate upon a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for energy optimization and identifying an energy efficiency program for a property, the computer-implemented method performed by one or more processors of a computing system in communication with one or more data sources, the computer-implemented method comprising:

receiving, by the one or more processors, input data associated with the property from one or more sensors, wherein the input data includes attributes, and wherein the attributes include historical energy usage data, real-time energy consumption data, and location-specific attributes of the property;

analyzing, by the one or more processors, the input data to determine a property profile including integrating the input data into a unified framework and normalizing the input data for compatibility across a plurality of data formats;

inputting, by the one or more processors, the property profile and data from the one or more data sources for one or more energy efficiency programs into a machine-learning model;

in response to the inputting, processing, by the one or more processors utilizing the machine-learning model, the input data to (i) classify one or more energy usage patterns of the property, and (ii) predict one or more energy savings inefficiencies for the property;

adjusting, by the one or more processors, one or more weights of the machine-learning model in response to a deviation between a set of predicted savings and a set of actual energy savings;

matching, by the one or more processors utilizing the machine-learning model with the one or more adjusted weights, at least one energy efficiency program from the one or more energy efficiency programs to the property based upon the input data and the predicted one or more energy savings inefficiencies;

generating, by the one or more processors, an energy assessment of the property and a cost analysis based upon the predicted one or more energy savings inefficiencies and the at least one energy efficiency program; and generating, by the one or more processors, an interactive visualization of the energy assessment and the at least one energy efficiency program in a graphical user interface of a device, wherein the visualization dynamically updates based upon real-time data received from the one or more sensors corresponding to energy usage, and wherein the dynamically updated interactive visualization displays (i) one or more energy consumption patterns over time, (ii) one or more projected impacts of applying one or more selected energy efficiency programs, and (ii) one or more highlighted inefficiencies and trends.

2. The computer-implemented method of claim 1, wherein classifying the one or more energy usage patterns of the property further comprises:

analyzing, by the one or more processors utilizing the machine-learning model, historical energy consumption data associated with one or more properties of a similar size, a similar location, or a similar type with the real-time energy consumption data associated with the property; and classifying, by the one or more processors utilizing the machine-learning model, the one or more energy usage patterns of the property into one or more categories, wherein the one or more categories include a high-efficiency property category indicating one or more optimized energy consumption patterns, a moderate-efficiency property category indicating one or more standard energy consumption patterns with one or more minor inefficiencies, or a low-efficiency property category indicating an excessive energy consumption.

3. The computer-implemented method of claim 2, wherein predicting the one or more energy savings inefficiencies further comprises:

determining, by the one or more processors utilizing the machine-learning model, one or more energy consumption patterns as deviating from one or more optimal energy usage patterns; and identifying, by the one or more processors utilizing the machine-learning model, the one or more energy consumption patterns as energy savings inefficient.

4. The computer-implemented method of claim 1, wherein matching the at least one energy efficiency program to the property further comprises:

analyzing, by the one or more processors, one or more eligibility criteria for the one or more energy efficiency programs, wherein the one or more eligibility criteria include location data, property type, or one or more energy usage requirements;

comparing, by the one or more processors, attribute data, the one or more energy usage patterns, or the predicted one or more energy savings inefficiencies associated with the property to the one or more eligibility criteria; and selecting, by the one or more processors, the at least one energy efficiency program that aligns with the attribute data, the one or more energy usage patterns, or the predicted one or more energy savings inefficiencies associated with the property.

5. The computer-implemented method of claim 1, wherein generating the energy assessment of the property further comprises:

simulating, by the one or more processors, an impact of the at least one energy efficiency program based upon the predicted one or more energy savings inefficiencies;

estimating, by the one or more processors, a reduction in one or more of (i) one or more energy inefficiencies, (ii) the energy usage, or (iii) one or more associated costs; and generating, by the one or more processors, a comparative analysis between a current energy profile of the property and a predicted energy profile of the property after implementing the at least one energy efficiency program.

6. The computer-implemented method of claim 1, wherein the cost analysis includes a calculation of expected savings, one or more payback periods, and a return upon investments for implementing one or more upgrades.

7. The computer-implemented method of claim 1, wherein the at least one energy efficiency program includes one or more of (i) a financial assistance for upgrading one or more energy-efficient appliances, (ii) a tax credit or deduction for implementing one or more energy-saving improvements, (iii) a subsidy for installation of one or more renewable energy systems, (iv) a discount upon an energy-efficient home insulation, or (v) financing options for purchasing an energy-efficient equipment with one or more reduced interest rates.

8. The computer-implemented method of claim 1, further comprising:

determining, by the one or more processors, a completion of one or more actions recommended by the at least one energy efficiency program by a user; and providing, by the one or more processors, one or more rewards to the user, wherein the one or more rewards includes one or more of (i) one or more loyalty points redeemable for one or more energy-efficient products or one or more services, (ii) one or more discounts upon one or more future energy-efficient upgrades, (iii) a membership program offering one or more personalized energy savings consultations, or (iv) one or more tiered benefits based upon one or more energy savings milestones achieved.

9. The computer-implemented method of claim 8, wherein the one or more actions include one or more of (i) purchasing and installing the one or more energy-efficient products, (ii) completing a home energy evaluation, (iii) sharing energy usage data for tracking and analysis, (iv) adhering to timelines specified by the at least one energy efficiency program, (v) participating in educational programs or workshops related to the energy savings offered by the at least one energy efficiency program, (vi) referring other users to the at least one energy efficiency program, or (vii) sharing feedback or reviews upon effectiveness of energy-saving upgrades.

10. The computer-implemented method of claim 1, wherein matching the at least one energy efficiency program further comprises:

analyzing, by the one or more processors, local climate patterns and seasonal variations to predict their influence upon the one or more energy usage patterns of the property;

identifying, by the one or more processors, the at least one energy efficiency program that specializes upon energy-saving upgrades during such environmental conditions; and generating, by the one or more processors, a recommendation of the at least one energy efficiency program to optimize energy efficiency.

11. The computer-implemented method of claim 1, further comprising:

determining, by the one or more processors, an environmental benefit of implementing the at least one energy efficiency program, wherein the environmental benefit includes a reduced carbon footprint, a reduced energy wastage, or an alignment with one or more renewable energy utilization goals; and assigning, by the one or more processors, a score indicating a contribution by the property to an environmental conservation and an energy efficiency.

12. A computer system for energy optimization and identifying an energy efficiency program for a property, comprising:

one or more processors of a computing system in communication with one or more data sources; and at least one non-transitory computer readable medium storing instructions which, when executed by the one or more processors, cause the one or more processors to perform operations comprising:

receiving input data associated with the property from one or more sensors, wherein the input data includes attributes, and wherein the attributes include historical energy usage data, real-time energy consumption data, and location-specific attributes of the property;

analyzing the input data to determine a property profile including integrating the input data into a unified framework and normalizing the input data for compatibility across a plurality of data formats;

inputting the property profile and data from the one or more data sources for one or more energy efficiency programs into a machine-learning model;

in response to the inputting, processing, utilizing the machine-learning model, the input data to (i) classify one or more energy usage patterns of the property, and (ii) predict one or more energy savings inefficiencies for the property;

adjusting one or more weights of the machine-learning model in response to a deviation between a set of predicted savings and a set of actual energy savings;

matching, utilizing the machine-learning model with the one or more adjusted weights, at least one energy efficiency program from the one or more energy efficiency programs to the property based upon the input data and the predicted one or more energy savings inefficiencies;

generating an energy assessment of the property and a cost analysis based upon the predicted one or more energy savings inefficiencies and the at least one energy efficiency program; and generating an interactive visualization of the energy assessment and the at least one energy efficiency program in a graphical user interface of a device, wherein the visualization dynamically updates based upon real-time data received from the one or more sensors corresponding to energy usage, and wherein the dynamically updated interactive visualization displays (i) one or more energy consumption patterns over time, (ii) one or more projected impacts of applying one or more selected energy efficiency programs, and (ii) one or more highlighted inefficiencies and trends.

13. The system of claim 12, wherein classifying the one or more energy usage patterns of the property further comprises:

analyzing, utilizing the machine-learning model, historical energy consumption data associated with one or more properties of a similar size, a similar location, or a similar type with the real-time energy consumption data associated with the property; and classifying, utilizing the machine-learning model, the one or more energy usage patterns of the property into one or more categories, wherein the one or more categories include a high-efficiency property category indicating one or more optimized energy consumption patterns, a moderate-efficiency property category indicating one or more standard energy consumption patterns with one or more minor inefficiencies, or a low-efficiency property category indicating an excessive energy consumption.

14. The system of claim 13, wherein predicting the one or more energy savings inefficiencies further comprises:

determining, utilizing the machine-learning model, one or more energy consumption patterns as deviating from one or more optimal energy usage patterns; and identifying, utilizing the machine-learning model, the one or more energy consumption patterns as energy savings inefficient.

15. The system of claim 12, wherein matching the at least one energy efficiency program to the property further comprises:

analyzing one or more eligibility criteria for the one or more energy efficiency programs, wherein the one or more eligibility criteria include location data, property type, or one or more energy usage requirements;

comparing attribute data, the one or more energy usage patterns, or the predicted one or more energy savings inefficiencies associated with the property to the one or more eligibility criteria; and selecting the at least one energy efficiency program that aligns with the attribute data, the one or more energy usage patterns, or the predicted one or more energy savings inefficiencies associated with the property.

16. The system of claim 12, wherein generating the energy assessment of the property further comprises:

simulating an impact of the at least one energy efficiency program based upon the predicted one or more energy savings inefficiencies;

estimating a reduction in one or more of (i) one or more energy inefficiencies, (ii) the energy usage, or (iii) one or more associated costs; and generating a comparative analysis between a current energy profile of the property and a predicted energy profile of the property after implementing the at least one energy efficiency program.

17. A non-transitory computer readable medium for energy optimization and identifying an energy efficiency program for a property, the non-transitory computer readable medium storing instructions which, when executed by one or more processors of a computing system in communication with one or more data sources, cause the one or more processors to perform operations comprising:

receiving input data associated with the property from one or more sensors, wherein the input data includes attributes, and wherein the attributes include historical energy usage data, real-time energy consumption data, and location-specific attributes of the property;

analyzing the input data to determine a property profile including integrating the input data into a unified framework and normalizing the input data for compatibility across a plurality of data formats;

inputting the property profile and data from the one or more data sources for one or more energy efficiency programs into a machine-learning model;

in response to the inputting, processing, utilizing the machine-learning model, the input data to (i) classify one or more energy usage patterns of the property, and (ii) predict one or more energy savings inefficiencies for the property;

adjusting one or more weights of the machine-learning model in response to a deviation between a set of predicted savings and a set of actual energy savings;

matching, utilizing the machine-learning model with the one or more adjusted weights, at least one energy efficiency program from the one or more energy efficiency programs to the property based upon the input data and the predicted one or more energy savings inefficiencies;

generating an energy assessment of the property and a cost analysis based upon the predicted one or more energy savings inefficiencies and the at least one energy efficiency program; and generating an interactive visualization of the energy assessment and the at least one energy efficiency program in a graphical user interface of a device, wherein the visualization dynamically updates based upon real-time data received from the one or more sensors corresponding to energy usage, and wherein the dynamically updated interactive visualization displays (i) one or more energy consumption patterns over time, (ii) one or more projected impacts of applying one or more selected energy efficiency programs, and (ii) one or more highlighted inefficiencies and trends.

18. The non-transitory computer readable medium of claim 17, wherein classifying the one or more energy usage patterns of the property further comprises:

analyzing, utilizing the machine-learning model, historical energy consumption data associated with one or more properties of a similar size, a similar location, or a similar type with the real-time energy consumption data associated with the property; and classifying, utilizing the machine-learning model, the one or more energy usage patterns of the property into one or more categories, wherein the one or more categories include a high-efficiency property category indicating one or more optimized energy consumption patterns, a moderate-efficiency property category indicating one or more standard energy consumption patterns with one or more minor inefficiencies, or a low-efficiency property category indicating an excessive energy consumption.

19. The non-transitory computer readable medium of claim 18, wherein predicting the one or more energy savings inefficiencies further comprises:

determining, utilizing the machine-learning model, one or more energy consumption patterns as deviating from one or more optimal energy usage patterns; and identifying, utilizing the machine-learning model, the one or more energy consumption patterns as energy savings inefficient.

20. The system of claim 12, wherein matching the at least one energy efficiency program further comprises:

analyzing local climate patterns and seasonal variations to predict their influence upon the one or more energy usage patterns of the property;

identifying the at least one energy efficiency program that specializes upon energy-saving upgrades during such environmental conditions; and generating a recommendation of the at least one energy efficiency program to optimize energy efficiency.

* * * * *